Patented Aug. 29, 1933

1,924,090

UNITED STATES PATENT OFFICE 1,924,090

MONO-MOLECULAR CONDENSATION PRODUCT OF 1.4.5.8 - NAPHTHALENE - TETRA - CARBOXYLIC ACID AND A PROCESS OF PREPARING IT

Wilhelm Eckert and Otto Braunsdorf, Frankfort-on-the-Main-Hoechst, Germany, assignors to General Aniline Works, Inc., New York, N. Y., a Corporation of Delaware No Drawing. Application August 21, 1931, Serial No. 558,632, and in Germany September 5, 1930

7 Claims. (Cl. 260—44)

The present invention relates to monomolecular condensation products of 1.4.5.8-naphthalene-tetracarboxylic acid and a process of preparing them.

We have found that monomolecular condensation products of 1.4.5.8-naphthalene-tetracarboxylic acid are obtainable in an advantageous manner by condensing a salt of 1.4.5.8-naphthalene-tetracarboxylic acid, which contains in 1.8-position two free carboxylic acid groups or the dicarboxylic anhydride group, with a compound of the type R—NH₂ wherein R represents a substituted or unsubstituted aryl group or a salt thereof, preferably in the presence of a suitable solvent or diluent as, for instance, water or a solvent which is mixable with water. The two free carboxylic acid groups and the dicarboxylic anhydride group are to be considered as equivalent groups in the present invention.

Naphthoylene-aryl-imidazole-peri-dicarboxylic acids or their anhydrides or derivatives thereof which correspond with the following formulæ:

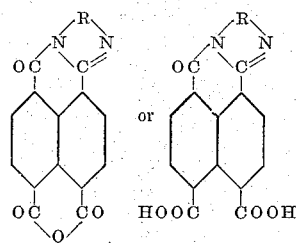

wherein R represents a substituted or unsubstituted arylene group bound in two adjacent positions to the nitrogen atoms, are obtained as main products by condensing a salt of 1.4.5.8-naphthalene-tetracarboxylic acid, as defined above, with a compound of the type R—NH₂ containing a further NH₂-group in ortho position to the NH₂-group, that is to say an ortho-diamine, or a salt thereof, in the presence of a suitable solvent or diluent.

1.4.5.8-naphthalene-tetracarboxylic acid-aryl-mono-imides or their anhydrides and derivatives thereof which correspond with the following formulæ:

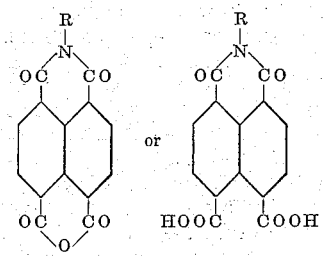

wherein R represents a substituted or unsubstituted aryl group, are obtained by causing a salt of 1.4.5.8-naphthalene-tetracarboxylic acid, as defined above, to react with a compound of the type R—NH₂, which contains no further NH₂-group in ortho position to the NH₂-group, or a salt thereof, in the presence of a suitable solvent or distributing agent.

It is most advantageous to use water as a solvent, for this makes it possible to prepare the salts of 1.4.5.8-naphthalene-tetracarboxylic acid necessary for the reaction in an easy manner by dissolving the said acid, for instance, with such a quantity of alkali, alkali carbonate, ammonia, pyridine or the like as is necessary for the formation of a suitable salt. In the solution, thus obtained, the condensation with ortho-diamine and amines may advantageously be carried out.

The new compounds are valuable intermediate products to be used in the manufacture of dyestuffs.

The compounds of the general probable formula:

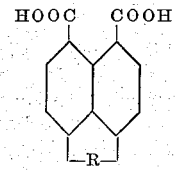

wherein R means one of the bivalent radicals

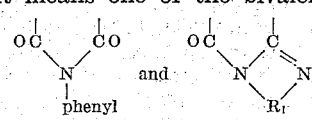

R₁ representing a bivalent aromatic radical of the group consisting of those of the following formulæ:

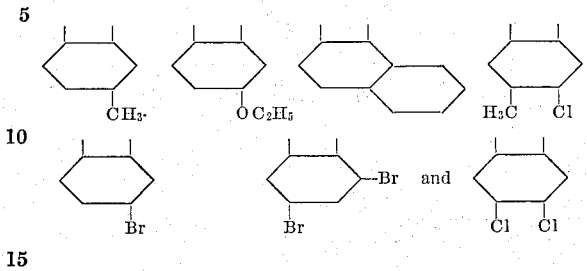

are to be considered as new.

The following examples serve to illustrate the invention, but they are not intended to limit it thereto, the parts being by weight:

(1) 30 parts of 1.4.5.8-naphthalene-tetracarboxylic acid are dissolved in 1000 parts of water by adding such a quantity of sodium carbonate as is necessary for the formation of a di-sodium salt. The solution of the sodium salt thus obtained is then heated to boiling, whereupon 11 parts of 1.2-diaminobenzene are added and the whole is further heated for some time. The solution thereby quickly assumes a yellow coloration and slowly becomes turbid on account of the separation of a reddish precipitate. When the reaction is finished, the solution is filtered and slowly acidified at boiling temperature with such a quantity of hydrochloric acid or dilute sulfuric acid that reaction towards Congo has not yet been attained. Under these conditions the naphthoylene-benzimidazole-peri-dicarboxylic acid separates in the form of a yellow precipitate whereas the naphthalene-tetracarboxylic acid which has not been reacted upon probably remains dissolved in the form of an acid salt and is precipitated only by further acidification. The naphthoylene-benzimidazole-peri-dicarboxylic acid of the following formula:

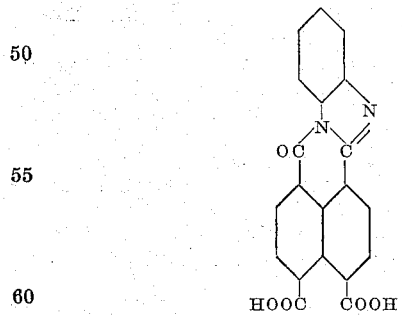

is a yellow powder which dissolves in concentrated sulfuric acid to a yellow solution; it melts only at temperatures above 350° C. It dissolves in dilute alkalies or alkali carbonates to a yellow solution and yields at low temperature with sodium hydrosulfite and a small quantity of alkali a green vat-like solution.

It is also advantageous to use the pyridine salt of naphthalene-tetracarboxylic acid or the ammonium salt (which is easily prepared) for effecting the mono-molecular condensation with 1.2-diaminobenzene.

(2) 15 parts of 1.4.5.8-naphthalene-tetracarboxylic acid are suspended in water and dissolved by addition of about 7–8 parts of potassium carbonate. Into this solution of potassium salt boiling in a reflux apparatus there are gradually introduced 10–11 parts of diamino-benzene and the whole is subsequently boiled for some hours. The solution is filtered and thereby freed from a very small quantity of an insoluble reddish by-product which according to its properties, is to be considered as the diamino-diphenylimide of 1.4.5.8-naphthalene-tetracarboxylic acid; to the filtered solution, such a quantity of concentrated hydrochloric acid is then cautiously added at boiling temperature that reaction towards Congo is not yet attained. The naphtholyene-benzimidazole-peri-dicarboxylic acid which has separated in the form of a yellow, flaky precipitate, is filtered with suction, washed with hot water and dried. It has the same properties as the product obtainable according to Example 1.

(3) A potassium salt is prepared from 15 parts of 1.4.5.8-naphthalene-tetracarboxylic acid or the corresponding quantity of its anhydride in the manner described in Example 2 and is heated to boiling together with an aqueous solution of 8 parts of the hydrochloride of 4-methyl-1.2-diaminobenzene for some hours. The product is precipitated by the acid nascent from the hydrochloride of 4-methyl-1.2-diaminobenzene during the reaction. The residue obtained by filtering the solution with suction, is treated with dilute sodium carbonate solution at raised temperature. The yellow sodium salt solution thus obtained is freed from a small quantity of a red by-product formed by bimolecular reaction and hydrochloric acid is cautiously added at boiling temperature until a test portion filtered from the reddish-yellow precipitate is nearly colorless and yields on further acidification only unchanged naphthalene-tetracarboxylic acid. The precipitate thus obtained is probably the anhydride of naphtholyene-4-methylbenzimidazole-peri-dicarboxylic acid of the following formula:

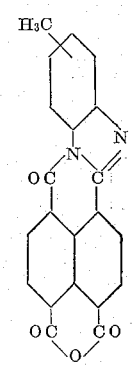

It is filtered with suction while hot, washed with hot water and dried. It is a reddish powder which dissolves in concentrated sulfuric acid to a yellow solution.

(4) By heating an aqueous solution of the dipotassium salt of 1.4.5.8-naphthalene-tetracarboxylic acid with 4-ethoxy-1.2-diaminobenzene for some time to boiling, there is obtained, besides a small quantity of the dyestuff formed by bimolecular condensation, as main product a naphthoylene - ethoxy-benzimidazole-peri-dicarboxylic acid. It is precipitated by means of mineral acid at room temperature from its potassium or sodium salt solution in the form of reddish yellow flakes and is transformed, even by heating in water, into its more deeply colored anhydride, which is immediately precipitated on acidification of a hot solution of its salts. The naphthoylene-ethoxy-benzimidazole-peri-dicarboxylic acid dissolves in concentrated sulfuric acid to a reddish solution. Its anhydride has the following formula:

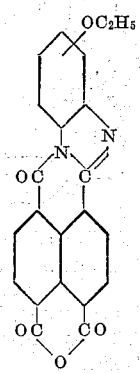

(5) A solution of a dipotassium or disodium salt of 1.4.5.8-naphthalene-tetracarboxylic acid is caused to react with 1.2-diaminonaphthalene or the hydrochloride of this base and there is obtained, besides a small quantity of insoluble bimolecular condensation product, the naphthoylenenaphthimidazole — peri-dicarbaxylic acid which, after filtering the solution from the insoluble product, may be isolated from the solution in the manner described in the preceding examples. It is a brown powder which dissolves in concentrated sulfuric acid to a reddish violet solution. The solution of the sodium salt is yellow. Its anhydride yields with alkali and hydrosulfite at low temperatures an unstable green solution.

(6) 26.8 parts of the di-anhydride of 1.4.5.8-naphthalene-tetracarboxylic acid are dispersed in about 800 parts of water and dissolved by heating and adding such a quantity of potassium carbonate as is necessary for the formation of the dipotassium salt. To this solution which is kept boiling there are gradually added 18 parts of 5-chloro-4-methyl-1.2-diaminobenzene and the whole is further stirred for some hours. In the course of the reaction there separates a sparingly soluble yellow salt besides a very small quantity of the bimolecular insoluble condensation product. When the reaction is finished, the whole is dissolved in a small quantity of sodium carbonate solution, wherein the by-products are insoluble, filtered and to the dark-yellow filtrate there is cautiously added at boiling temperature such a quantity of hydrochloric acid that only the naphthoylene-chloromethyl-benzimidazole - peri-dicarboxylic acid, which has been formed, is precipitated. It is obtained in the form of a flaky yellow precipitate. It dissolves in concentrated sulfuric acid to a reddish-yellow solution. It corresponds to either of the following formulæ:

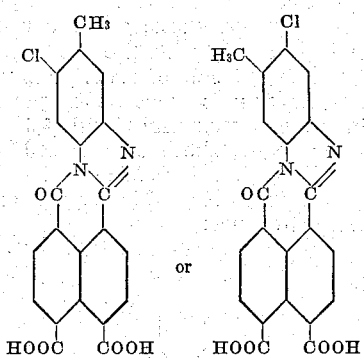

(7) 15 parts of 1.4.5.8-naphthalene-tetracarboxylic acid are dissolved in water in the form of its potassium salt by addition of about 7-8 parts of potassium carbonate; 5 parts of aniline are added and the whole is heated to boiling for some time. The solution is freed from a small quantity of insoluble by-products by filtration and is acidified at boiling temperature. There is precipitated at first the 1.4.5.8-naphthalene-tetracarboxylic acid monophenylimide in the form of a white microcrystalline body. It corresponds with the following formula:

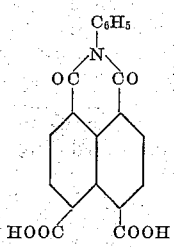

In the dry state it is a white powder which does not melt even when heated to 350° C.; in concentrated sulfuric acid it dissolves to a feebly yellow solution and with hydrosulfite and alkali it yields at low temperature a bluish-red solution of a leuco-compound showing a red fluorescence.

(8) 30 parts of 1.4.5.8-naphthalene-tetracarboxylic acid are dispersed in 500 parts of water and dissolved at boiling temperature in the form of its potassium salt by addition of 18 parts of potassium carbonate. To this solution 20 parts of 4-bromo-1.2-diaminobenzene are added and the whole is boiled for some time. The hot solution is freed from a small quantity of insoluble, bimolecular condensation product by filtration by suction and the sodium salt of naphthoylene-brombenzimidazole-peri-dicarboxylic acid is salted out by addition of a saturated sodium chloride solution to the filtrate. Any 1.4.5.8-naphthalene-tetracarboxylic acid which has not reacted remains in solution. From its sodium salt, the free naphthoylene - brombenzimidazole - peri - dicarboxylic acid or the anhydride thereof may be obtained in the usual manner. The anhydride forms an orange powder which dissolves in concentrated sulfuric acid to a yellow solution.

(9) By using instead of the 4-bromo-1.2-diamino-benzene referred to in Example 8 the corresponding quantity of 3.5-dibromo-1.2-diaminobenzene, there is obtained a naphthoylene-dibromo-benzimidazole-peri-dicarboxylic acid. Its anhydride is obtained in the form of an orange-red powder; it dissolves in concentrated sulfuric acid to a yellow solution.

(10) By causing a salt of 1.4.5.8-naphthalene-tetracarboxylic acid to react in the manner described in the above examples with 4.5-dichloro-1.2-diaminobenzene, there is obtained a naphthoylene-dichloro-benzimidazole-peri-dicarboxylic acid or its anhydride which corresponds with the following formula:

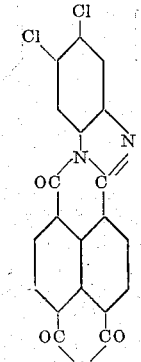

It forms a reddish powder which dissolves in sulfuric acid to a reddish yellow solution. Its sparingly soluble sodium salt crystallizes in small yellowish laminæ.

We claim:

1. The process which comprises condensing a salt of 1.4.5.8-naphthalene-tetracarboxylic acid, which contains in 1.8-position two free carboxylic acid group, with a compound of the type R—NH₂, wherein R represents an aryl group of the carbocyclic series which may contain substituents of the group consisting of amino, alkyl, alkoxy and halogen.

2. The process which comprises condensing a salt of 1.4.5.8-naphthalene-tetracarboxylic acid, which contains in 1.8-position two free carboxylic acid groups, with a compound of the type R—NH₂, wherein R represents a phenyl group which may contain substituents of the group consisting of amino, alkyl, alkoxy and halogen.

3. The process which comprises condensing the disodium salt of 1.4.5.8-naphthalene-tetracarboxylic acid dissolved in water, with 1.2-diaminobenzene by heating to boiling for some time.

4. As new products, the compounds of the general probable formula:

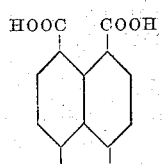

wherein R means the bivalent radical

R₁ representing a bivalent aromatic radical of the group consisting of those of the following formulæ:

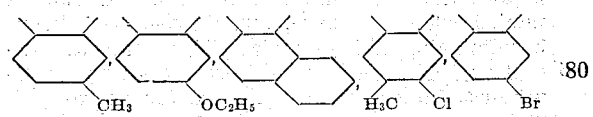
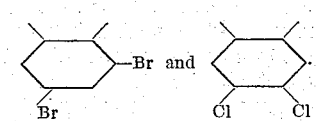

5. As a new product, the compound of the following formula

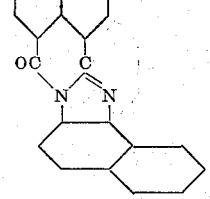

said product forming a brown powder which dissolves in concentrated sulfuric acid to a reddish violet solution, its sodium salt dissolving to a yellow solution and its anhydride yielding with alkali and hydrosulfite at low temperatures an unstable green solution.

6. As a new product, the compound of the following formula:

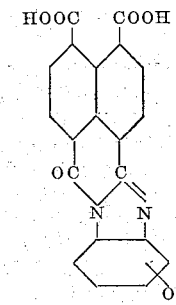

said product forming reddish yellow flakes which dissolve in concentrated sulfuric acid to a reddish solution.

7. As a new product, the compound of the following formula:

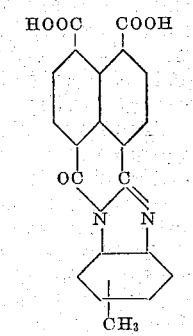

forming a reddish powder which dissolves in concentrated sulfuric acid to a yellow solution.

WILHELM ECKERT.
OTTO BRAUNSDORF.